United States Patent
Yoshioka et al.

(10) Patent No.: US 9,048,628 B2
(45) Date of Patent: Jun. 2, 2015

(54) SOLID-STATE DYE LASER MEDIUM AND PROCESS FOR PRODUCTION THEREOF

(75) Inventors: Hiroaki Yoshioka, Fukuoka (JP); Yuji Oki, Fukuoka (JP); Yu Yang, Fukuoka (JP)

(73) Assignee: KYUSHU UNIVERSITY, NATIONAL UNIVERSITY CORPORATION, Fukuoka-Shi, Fukuoka (JP)

(*) Notice: Subject to any disclaimer, the term of this patent is extended or adjusted under 35 U.S.C. 154(b) by 5 days.

(21) Appl. No.: 14/008,315

(22) PCT Filed: Mar. 29, 2012

(86) PCT No.: PCT/JP2012/059278
§ 371 (c)(1),
(2), (4) Date: Dec. 6, 2013

(87) PCT Pub. No.: WO2012/133920
PCT Pub. Date: Oct. 4, 2012

(65) Prior Publication Data
US 2014/0294032 A1  Oct. 2, 2014

(30) Foreign Application Priority Data
Mar. 31, 2011 (JP) .................. 2011-079740

(51) Int. Cl.
| H01S 3/14 | (2006.01) |
| H01S 3/20 | (2006.01) |
| H01S 3/16 | (2006.01) |
| C09B 57/10 | (2006.01) |
| C09B 67/08 | (2006.01) |
| H01S 3/06 | (2006.01) |
| H01S 3/00 | (2006.01) |

(52) U.S. Cl.
CPC ............... *H01S 3/168* (2013.01); *C09B 57/10* (2013.01); *C09B 67/0013* (2013.01); *H01S 3/0619* (2013.01); *H01S 3/0007* (2013.01)

(58) Field of Classification Search
USPC ................................. 372/39, 51, 53
See application file for complete search history.

(56) References Cited

U.S. PATENT DOCUMENTS

| 5,708,099 A | 1/1998 | Kushibiki et al. |
| 2005/0029931 A1 | 2/2005 | King et al. |
| 2008/0277606 A1 | 11/2008 | Wang et al. |

FOREIGN PATENT DOCUMENTS

| JP | 9-124794 A | 5/1997 |
| JP | 11-246661 A | 9/1999 |
| JP | 2002-264244 A | 9/2002 |
| JP | 2005-506438 A | 3/2005 |
| JP | 2009/516162 A | 4/2009 |
| WO | WO 2009/111316 A2 | 9/2009 |

OTHER PUBLICATIONS

International Search Report issued Jul. 10, 2012, in PCT International Application No. PCT/JP2012/059278.
PCT International Preliminary Report on Patentability (IPRP) issued in PCT International Application No. PCT/JP2012/059278.

*Primary Examiner* — Armando Rodriguez
(74) *Attorney, Agent, or Firm* — Birch, Stewart, Kolasch & Birch, LLP

(57) ABSTRACT

The challenge of providing a long-life solid-state dye laser medium is tackled. This challenge is solved by a solid-state dye laser medium comprising a polydimethylsiloxane, and a dye dissolved in the polydimethylsiloxane. The dye is preferably a pyrromethene dye.

10 Claims, 6 Drawing Sheets

Fig. 2 (A)
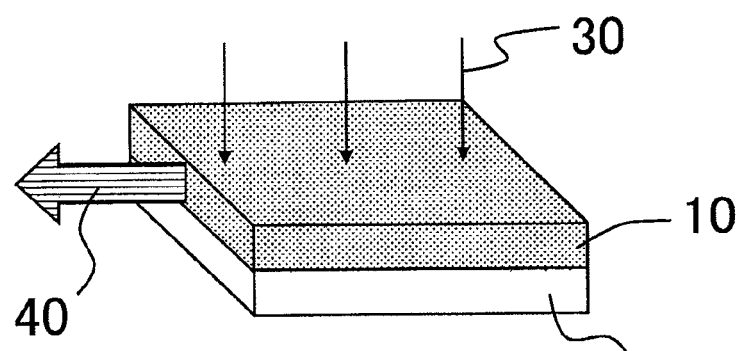
Fig. 2 (B)
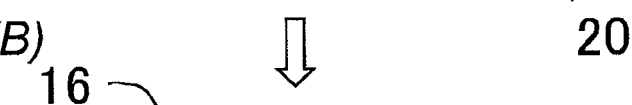
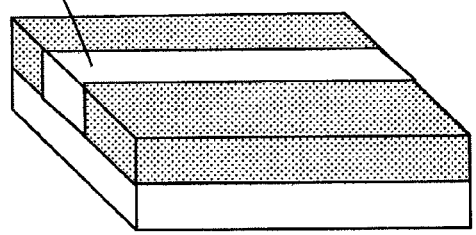
Fig. 2 (C)
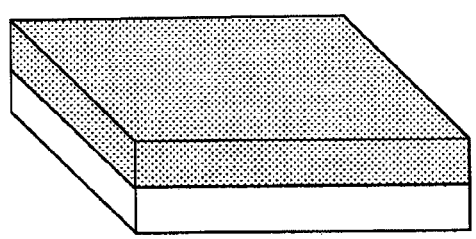

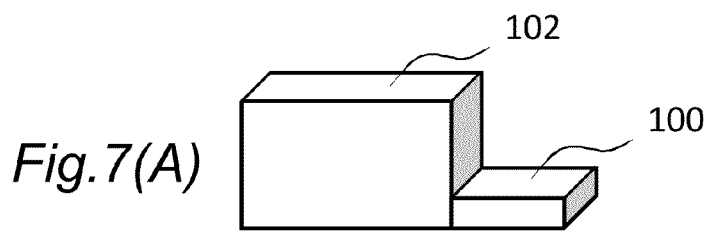
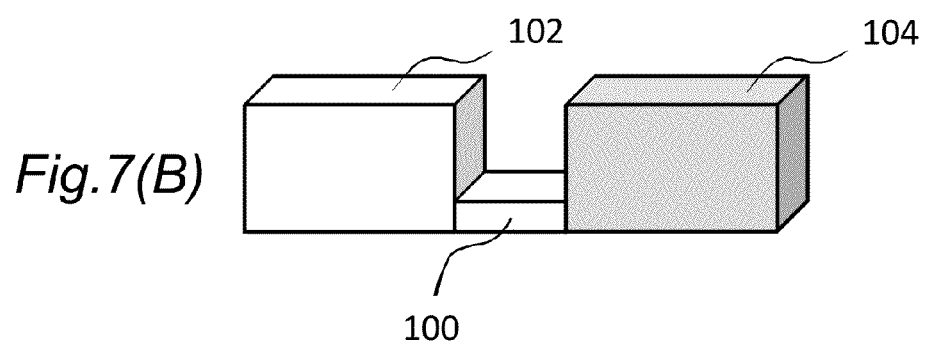

SOLID-STATE DYE LASER MEDIUM AND PROCESS FOR PRODUCTION THEREOF

TECHNICAL FIELD

This invention relates to a solid-state dye laser medium, and a process for production thereof.

BACKGROUND ART

Dye lasers using dyes as media have advantages, such as the ability to select oscillation wavelengths depending on dyes for use, and they find industrially wide use. Usually, media comprising dyes dissolved in organic solvents are used in dye lasers. In recent years, solid dye lasers having dyes added to solid media such as glass and polymer have been proposed because of their excellent handleability (Non-Patent Documents 1 to 4). However, conventional solid dye lasers have a short service life. Thus, they are suitable for single-use applications such as biochips, but have posed the problem that they are not suitable for uses requiring a long service life such as environmental sensing or optical communication.

CITATION LIST

Non-Patent Documents

[Non-Patent Document 1] Xiao-Lei Zhu et al., Appl. Opt., 39, p. 3104 (2000)
[Non-Patent Document 2] M. Ichikawa et al., Jpn. J. Appl. Phys., 40, p. 799 (2001)
[Non-Patent Document 3] Y. Oki et al., Jpn. J. Appl. Phys., 41, p. 6370 (2002)
[Non-Patent Document 4] Y. Oki et al., Opt. Commun., 214, p. 227 (2002)

SUMMARY OF INVENTION

Technical Problems

In the light of the above-mentioned circumstances, the present invention tackles the challenge of providing a solid-state dye laser medium with excellent durability.

Solution to Problems

The present inventors have conducted studies in connection with the short service lives of the conventional solid dye lasers, and have found that the deterioration of the dye in a portion irradiated with excitation light is the cause for this drawback. Based on this finding, they have gained the idea that the durability of a solid dye laser may be improvable if it is possible to perform dye circulation by which the deteriorated dye present in the portion irradiated with excitation light is replaced by an undeteriorated dye. After thorough studies, the inventors have found that the dye circulation can be carried out by use of polydimethylsiloxane having a nanoporous structure as a solid medium. It is very difficult, however, for polydimethylsiloxane to dissolve dye molecules having polarity simply to a concentration at which laser oscillation can take place. The polydimethylsiloxane, if unchanged, is difficult to use as a laser medium. Thus, a dye easily soluble in polydimethylsiloxane has been selected, and a method for dissolving the dye has been worked out to enable laser oscillation. Further, how to increase the solubility of a less soluble dye has been devised to accomplish the present invention.

That is, the aforementioned challenge is solved by the following aspects of the present invention:
(1) A solid-state dye laser medium comprising a polydimethylsiloxane and a dye dissolved in the polydimethylsiloxane.
(2) A process for producing a solid-state dye laser medium, comprising the steps of:
  dissolving a dye in a nonpolar solvent having a dielectric constant of 5 or less to obtain a solution;
  mixing the solution with a liquid dimethylsiloxane oligomer to obtain a composition;
  removing the nonpolar solvent in the coating film;
  coating the composition on a substrate to form a coating film; and
  polymerizing or crosslinking the oligomer in the coating film to form a polydimethylsiloxane.
(3) A process for producing a solid-state dye laser medium, comprising the steps of:
  dissolving a dye in a silicone oil to obtain a solution;
  mixing the solution with a liquid dimethylsiloxane oligomer to obtain a composition;
  coating the composition on a substrate to form a coating film; and
  polymerizing or crosslinking the oligomer in the coating film to form a polydimethylsiloxane.
(4) A process for producing a solid-state dye laser medium, comprising the steps of:
  providing a polydimethylsiloxane;
  dissolving a dye in a medium, which does not swell the polydimethylsiloxane, to obtain a dye-containing medium; and
  bringing the medium and the polydimethylsiloxane into contact to disperse the dye in the polydimethylsiloxane.

Advantageous Effects of Invention

A solid-state dye laser medium with excellent durability can be provided by the present invention.

BRIEF DESCRIPTION OF THE DRAWINGS

FIGS. 2(A) to 2(C) are views showing the outline of a DFB laser using the solid-state dye laser medium of the present invention.
FIGS. 7(A), 7(B) are views showing other embodiments of a laser using the solid-state dye laser medium of the present invention.

DESCRIPTION OF EMBODIMENTS

Figure 1:
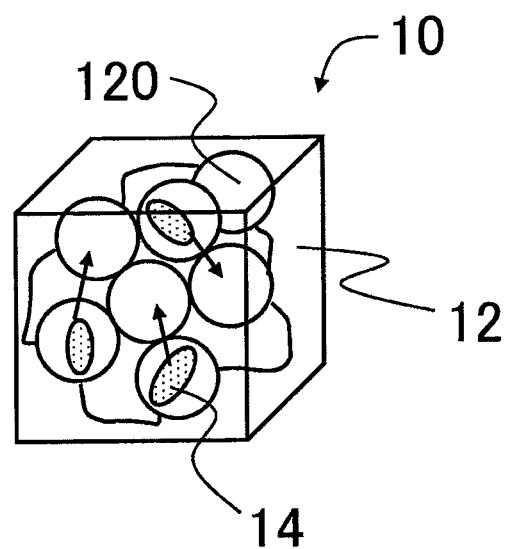
FIG. 1 is a view showing the outline of a solid-state dye laser medium according to the present invention.

The present invention will be described in detail below. The term "... to ...", as used herein, includes the starting value and the ending value.

1. Solid-State Dye Laser Medium

The term "solid-state dye laser medium" refers to a member capable of laser oscillation which contains a solid medium and a dye dissolved in the solid medium. The solid medium is a medium which can retain its shape at a temperature at which a laser is used (usually, 20 to 100° C.). In the present invention, the solid medium is a solid polydimethylsiloxane. The dye is an organic dye which can cause laser oscillation. The respective components will be explained below.

(1) Polydimethylsiloxane

The polydimethylsiloxane is a polymer comprising recurring units represented by —(CH$_3$)$_2$Si—O—.

The polydimethylsiloxane used in the present invention is solid at room temperature. Such a polydimethylsiloxane can be formed by polymerizing or crosslinking a liquid dimethylsiloxane oligomer (may hereinafter be referred to simply as "oligomer") which is a precursor for polydimethylsiloxane. The dimethylsiloxane oligomer is a dimer to decamer, preferably a dimer to tetramer, of the aforementioned recurring units, and is liquid at room temperature. The polymerization and crosslinking will be described later in detail.

As will be described later, with the solid-state dye laser medium of the present invention, the dye circulates within the medium, thus providing a laser excellent in durability. However, the space density of the polydimethylsiloxane influences dye circulation. This space density can be adjusted mainly by adding a silicone oil to be mentioned later, but has a high correlation with crosslinking density or the molecular weight of the polymer. The space density is highly correlated with hardness, and the durometer A hardness at 25° C. of the polydimethylsiloxane used in the present invention is preferably 60 or less.

(2) Dye

In the present invention, a dye dissolving in polydimethylsiloxane is used. As the dye, an organic dye in common use in the field concerned and dissolving in polydimethylsiloxane can be used. The dye concentration in the solid-state dye laser medium is preferably 2 mmol/L or more, and more preferably 3 mmol/L or more in order to obtain output. The upper limit of the dye concentration is selected in consideration of the output or cost, but usually, 200 mmol/L or less is preferred. The solubility of the dye in polydimethylsiloxane has correlation to the polarity of dye molecules. Since polydimethylsiloxane is nonpolar, the dye used in the present invention is also preferably nonpolar. From this point of view, a pyrromethene dye is preferred in the present invention. The pyrromethene dye is a dye having a skeleton represented by the following formula (1):

[Chemical Formula 1]

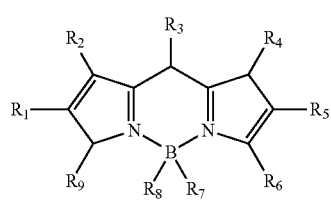

(1)

where R$_1$ to R$_6$ are each a hydrogen atom or an alkyl group having 1 to 4 carbon atoms, and R$_7$ and R$_8$ are each a halogen atom.

In the present invention, the dye in which R$_1$ and R$_5$ are each a t-butyl group, R$_2$, R$_4$, R$_6$ and R$_9$ are each a methyl group, R$_3$ is a hydrogen atom, and R$_7$ and R$_8$ are each a fluorine atom is preferred, or the dye in which R$_1$, R$_2$, R$_4$, R$_5$, R$_6$ and R$_9$ are each a methyl group, R$_3$ is a hydrogen atom, and R$_7$ and R$_8$ are each a fluorine atom is preferred. The former dye is available from Exciton, U.S.A., under the trade name PM597, and the latter dye, under the trade name PM650.

The PM597 dye can dissolve, at the highest concentration, in dimethylsiloxane, and is thus preferred as a dye for use in the present invention. However, its concentration is 3 mmol/L, a concentration barely exceeding 2 mmol/L necessary for attaining laser oscillation. The PM650, unchanged, poses difficulty in dissolving to a lower limit concentration at which laser oscillation becomes possible. Some of other pyrromethene dyes, if used unchanged, cannot dissolve to concentrations necessary for laser oscillation. If a silicone oil to be described later is used, however, the solubility of such dyes with low solubility can be increased.

(3) Silicone Oil

The solid-state dye laser medium of the present invention may further contain a silicone oil. The solubility of the dye in polydimethylsiloxane can be increased greatly by the silicone oil. The silicone oil is a generic term for silicon compounds liquid at room temperature.

In consideration of compatibility with polydimethylsiloxane (PDMS), exclusion of impurities affecting laser oscillation, and easy availability, the silicone oil for use in the present invention is preferably one lower in viscosity than the aforementioned polydimethylsiloxane precursor and having a dimethylsiloxane in its skeleton. The silicone oil terminated with a diglycidyl ether group (PDMS-DGE oil), an ethoxy group, or a propoxy group is preferred, because it increases the solubility of the dye further. Other silicone oils which may be used are silicon-containing (meth)acrylates such as 3-trimethoxysilyl (meth)acrylate, silicon-containing alkylamines such as N-[3-(trimethylsilyl)propyl]ethylenediamine, or epoxy group-containing trialkoxysilanes such as (3-glycidyloxypropyl)trimethoxysilane. These silicone oils may be present in a state where they have reacted with the aforementioned polydimethylsiloxane.

Since the polydimethylsiloxane is swollen with the silicone oil, the space density of the polydimethylsiloxane decreases. Thus, the dye molecules become easily movable in the polydimethylsiloxane. Hence, the addition of the silicone oil exhibits its effects particularly when large dye molecules are used.

On the other hand, the addition of the silicone oil may accelerate the formation of impurities by excitation light for laser oscillation, and thus may diminish laser oscillation characteristics or sustainability thereof. There is need, therefore, to determine the amount of the silicone oil used, in view of the balance between the required dye concentration and the formation of impurities. When the PDMS-DGE oil is used, for example, sufficient laser oscillation is obtained even with the use of up to 1 part by volume of the PDMS-DGE oil for 1 part by volume of the polydimethylsiloxane. Normally, however, the amount of the silicone oil is preferably 1 part by volume or less with respect to 1 part by volume of the polydimethylsiloxane.

Whether or not the solid-state dye laser medium of the present invention contains the silicone oil can be judged from the presence of a functional group derived from the silicone oil, hardness, space density, and so on.

(4) Characteristics

The solid-state dye laser medium of the present invention has excellent durability. The reasons are considered to be as follows: FIG. 1 is a view showing the outline of the solid-state dye laser medium of the present invention. In FIG. 1, the numeral 10 denotes a solid-state dye laser medium, 12 a solid medium composed of a polydimethylsiloxane, 120 cavities in a nanoporous structure within the polydimethylsiloxane, and 14 a dye, the arrows showing the movement of the dye. The polydimethylsiloxane solid medium 12 used in the present invention has, in its interior, the nano-size cavities 120 formed, for example, because polydimethylsiloxane chains are spring-shaped; that is, the polydimethylsiloxane solid medium 12 has a so-called nanoporous structure. The dye 14 used in the present invention can consecutively move inside the solid medium 12 through the cavities 120. Thus, even if the dye deteriorates upon irradiation with excitation light, the excitation light irradiation is discontinued, and the solid-state dye laser medium 10 is allowed to stand. As a result, the deteriorated dye moves to other portions with the passage of time, and a fresh dye 14 is carried into the light-irradiated portion. That is, dye circulation takes place to restore the performance of the laser. Furthermore, the polydimethylsiloxane chains are so flexible that although, at room temperature, the polydimethylsiloxane itself is solid, the cavities 120 have mobility and promote dye circulation further. Solid media, such as glass, used in the conventional solid-state dye laser media have no nanoporous structure, and thus do not cause dye circulation as in the solid-state dye laser medium of the present invention. Accordingly, the solid-state dye laser medium of the present invention has much higher durability than the conventional solid-state dye laser media.

2. Process for Production of Solid-State Dye Laser Medium

The solid-state dye laser medium of the present invention is preferably produced by the following process for production. This process for production will be described below.

2-1. First Production Process

A first production process comprises a step of dissolving a dye in a nonpolar solvent having a dielectric constant of 5 or less to obtain a solution; a step of mixing the solution with a liquid dimethylsiloxane oligomer (oligomer) to obtain a composition; a step of removing the nonpolar solvent in the coating film; a step of coating the composition rid of the solvent on a substrate to form a coating film; and a step of polymerizing or crosslinking the oligomer in the coating film from which the solvent has been removed, to form a polydimethylsiloxane. The respective steps will be explained below.

(1) Solution Preparation Step

In the present step, the aforementioned dye is dissolved in a nonpolar solvent having a dielectric constant of 5 or less to obtain a solution. Generally, polydimethylsiloxane has low polarity. Thus, in consideration of compatibility with a liquid dimethylsiloxane oligomer, a nonpolar solvent having a dielectric constant of 5 or less is used in the present step. The dielectric constant is a value defined as the ratio of the capacitance of a capacitor containing the nonpolar solvent as a dielectric to the capacitance of the same capacitor having a vacuum as a dielectric and, in the case of an organic solvent, it is an indicator representing polarity. That is, the lower the dielectric constant of the organic solvent, the lower its polarity is. Normally, the dielectric constant of an organic solvent is a value measured at 20° C. or 25° C. at atmospheric pressure, and is described in "Yozai Handbook" (A Handbook of Solvents) (KODANSHA LTD.). The nonpolar solvents having a dielectric constant of 5 or less, which are used in the present invention, include toluene (about 2.4), benzene (about 2.3), and hexane (about 2.0). The solvent used here is removed by evaporation in a later step, but the removal of the solvent by heating at 100° C. or higher may deteriorate the dye, etc., so that the solvent is preferably apt to volatilize at room temperature. Further, the solvent remaining in a tiny amount is likely to cause a photochemical reaction with dye molecules during laser operation to change the molecular properties. In the present invention, toluene minimally exerting adverse influence on the dye molecules is the most preferred solvent.

As stated earlier, the dye concentration in the solid-state dye laser medium is preferably 2 mmol/L or higher. Thus, the amount of the nonpolar solvent is selected so as to achieve this concentration and to minimize the amount of the nonpolar solvent added. Since the nonpolar solvent is mostly evaporated during the process, it essentially does not affect the dye concentration in the solid-state dye laser medium. If the nonpolar solvent remains, however, there arises a possibility that the properties of the dye will be changed or the deterioration of the dye will be accelerated. From the point of view, it is preferred that the amount of the nonpolar solvent used be as small as possible and that the dye be used at the saturated concentration at which the dye concentration is the highest.

(2) Composition Preparation Step

In the present step, the solution is mixed with a liquid dimethylsiloxane oligomer to obtain a composition. The mixing ratio (mass ratio) between the solution and the oligomer is selected such that the aforementioned dye concentration in the resulting solid-state dye laser medium can be achieved. The volume ratio between them is preferably in the range of 1:(0.01 to 0.5), but is more preferably as low as possible. Mixing may be performed using an electric stirrer or the like. Mixing may be carried out with heating, but is preferably performed at room temperature if the deterioration of the dye, for example, is taken into consideration.

(3) Solvent Removal Step

In the present step, the nonpolar solvent is evaporated and removed from the composition. To promote evaporation, the composition may be heated, but because of a risk for deterioration of the dye, evaporation is preferably performed at room temperature and under reduced pressure. The time required for removal may be adjusted, as appropriate.

(4) Solidification Agent Mixing Step

In the present step, a crosslinking agent or a curing accelerator (hereinafter, they may be collectively referred to as "solidification agent") for forming a solid polydimethylsiloxane upon reaction with the oligomer is added to the above composition. In the present invention, a publicly known solidification agent can be used, and its examples include alkoxysilanes such as ethyl silicate, and tin-based curing accelerators. The amount of the crosslinking agent or the curing accelerator used may be an ordinary amount. Mixing of the solidification agent starts a polymerization or crosslinking reaction. The reaction is completed in a time of the order of 1 to 12 hours. However, as the reaction proceeds, the fluidity of the composition declines. Thus, after initiation of the reaction, there needs to be a prompt shift to a next step before the fluidity is lost.

However, if the reaction of the dimethylsiloxane oligomer proceeds sufficiently without the use of the solidification agent in the later solidification step, the solidification agent mixing step can be omitted.

(5) Coating Film Formation Step

In the present step, the above composition is coated on a substrate to form a coating film. As the substrate, a publicly known base material, such as a glass plate or a plastic film, can be used. A publicly known method, such as casting (molding), bar coating, drawing with a dispenser, or spin coating, can be used for the formation of the coating film.

(6) Solidification Step

In the present step, the oligomer in the composition is reacted to form a solid polydimethylsiloxane. As mentioned earlier, the dimethylsiloxane oligomer is a dimer to decamer, preferably a dimer to tetramer, composed of the —(CH$_3$)$_2$Si—O— units, and is liquid at room temperature. Normally, the dimethylsiloxane oligomer has, in its molecules, functional groups capable of an addition reaction or a crosslinking reaction. Thus, the present step can be performed by addition-polymerizing the dimethylsiloxane oligomers to impart a high molecular weight, or by crosslinking the oligomers, or by addition-polymerizing and crosslinking the oligomers. To obtain a polydimethylsiloxane having higher hardness, it is preferred to perform the addition polymerization and crosslinking of the oligomers. Further, if the solidification agent has been added in the solidification agent mixing step, the reaction can be carried out more promptly.

The solidification reaction may be performed either by heating the dry coating film at 50 to 100° C., or keeping the reaction system at room temperature. Moreover, the present step may be performed under reduced pressure, whereby the solvent remaining even after the solvent removal step may be further removed simultaneously.

In the present step, a solid-state dye laser medium is obtained, and its thickness is preferably 5 to 200 μm.

2-2. Second Production Process

A second production process comprises: a step of dissolving a dye in a silicone oil to obtain a solution; a step of mixing the solution with a liquid dimethylsiloxane oligomer to obtain a composition; a step of coating the composition on a substrate to form a coating film; and a step of polymerizing or crosslinking the oligomer in the coating film to form a polydimethylsiloxane. The respective steps will be explained below.

(1) Solution Preparation Step

In the present step, the aforementioned dye is dissolved in the aforementioned silicone oil to obtain a solution. The amount of the silicone oil is adjusted in view of the balance between the degree of an increase in the solubility of the dye and oscillation characteristics obtained when the silicone oil is used in the laser medium. As mentioned above, however, the amount of the silicone oil when used in the laser medium is preferably 1 part by volume or less with respect to 1 part by volume of the polydimethylsiloxane. If the solubility of the dye is low, moreover, it is preferred to use a nonpolar solvent, as in the first production process, in combination with the silicone oil.

(2) Composition Preparation Step

The present step is as explained in the first process. However, the solubility of the dye in the above silicone oil is lower than the solubility of the dye in the nonpolar solvent mentioned in the first production process. Since the silicone oil does not evaporate, moreover, the silicone oil remains in the final solid-state dye laser medium. Thus, the mixing ratio between the silicone oil solution of the dye and the aforementioned oligomer is greatly different from the mixing ratio between the nonpolar solvent solution of the dye and the oligomer in the first production process. In the present step, the mixing ratio is adjusted in the light of the dye concentration and the silicone oil concentration in the final solid-state dye laser medium.

(3) Solvent Removal Step

If the nonpolar solvent is used in the solution preparation step, the solvent is removed as explained in the first production process.

(4) Solidification Agent Mixing Step and Coating Film Formation Step

These steps are as described in the first process.

(5) Solidification Step

The present step is also as explained in the first process. In the present process, the silicone oil having the dye dissolved therein and the dimethylsiloxane oligomer need not be reacted, or may be subjected to addition reaction with each other to form a polydimethylsiloxane.

2-3. Third Production Process

A third production process comprises: a step of providing a polydimethylsiloxane; a step of dissolving a dye in a medium, which does not swell the polydimethylsiloxane, to obtain a dye-containing medium; and a step of bringing the medium and the polydimethylsiloxane into contact to disperse the dye in the polydimethylsiloxane. The respective steps will be described below.

(1) Polydimethylsiloxane Provision Step

In the present step, a polydimethylsiloxane may be provided in any manner, but preferably, a solidification agent is added to the dimethylsiloxane oligomer for solidification, as stated earlier, whereby a polydimethylsiloxane is prepared.

(2) Dye-Containing Medium Preparation Step

In the present step, the aforementioned dye is dissolved in a medium, which does not swell the polydimethylsiloxane, to obtain a dye-containing medium. The medium which does not swell the polydimethylsiloxane refers to a solvent having so high polarity that it cannot enter the nonpolar polydimethylsiloxane; or a liquid or solid substance having so high a molecular weight that it cannot enter the polydimethylsiloxane. Water or an alcohol having 1 to 3 carbon atoms is named as an example of the former medium. An uncured dimethylsiloxane oligomer or a polydimethylsiloxane is named as the latter medium.

If a solvent such as water is used as the medium which does not swell the polydimethylsiloxane, the dye is dispersed or dissolved in water, whereby a dye-containing medium can be prepared. In this case, the concentration of the dye in the medium is preferably rendered higher than the concentration of the dye to be introduced into the polydimethylsiloxane. Concretely, if it is desired to introduce $5 \times 10^{-3}$ mol/liter of the dye into the polydimethylsiloxane, the dye concentration in the dye-containing medium is preferably set at a higher value than this amount.

If the uncured dimethylsiloxane oligomer is used as the medium which does not swell the polydimethylsiloxane, the composition obtained after the solution preparation step, the composition preparation step, and the solvent removal step of the first production process, for example, can be used as the dye-containing medium. If a polydimethylsiloxane is used as the medium which does not swell the polydimethylsiloxane, on the other hand, the solid-state dye laser medium obtained by the first production process, for example, can be used as the dye-containing medium.

(3) Contact Step

In the present step, the above dye-containing medium and the polydimethylsiloxane are brought into contact to disperse the dye in the polydimethylsiloxane. If the dye-containing medium is liquid, the contact can be performed, for example, by dipping the polydimethylsiloxane in the medium, or by coating the polydimethylsiloxane with the medium. If the dye-containing medium is solid, it is preferred to contact the medium with a part of the polydimethylsiloxane.

The temperature of the medium when contacted is not limited, but is preferably room temperature (23° C.) to 100° C., more preferably 25 to 80° C., and even more preferably 50 to 75° C. The contact time may be adjusted, as appropriate, but is preferably 3 to 24 hours. The higher the temperature of the medium, the shorter the contact time can be made.

According to the present process, the dye can be precluded from reacting with a solidification agent. Thus, the advantage is obtained that even a dye having a possibility of deteriorating upon reaction with a solidification agent can be used. In the first and second processes, moreover, if a high temperature of the order of 150 to 200° C. is necessary in solidifying the dimethylsiloxane oligomer having the dye dissolved therein, the dye may be deteriorated. According to the present process, by contrast, such an event can be avoided.

3. Solid-State Dye Laser

The solid-state dye laser of the present invention is equipped with the aforementioned solid-state dye laser medium, an excitation light source, and a resonance means. The excitation light source is a light source for exciting the dye, and a publicly known light source such as Nd:YAG laser can be used. The resonance means is a means for generating standing waves of light, such as a pair of mirrors. The resonance means corresponds to a diffraction grating in a DFB laser (distributed feedback laser).

FIGS. 2(A) to 2(C) are views showing an example of a DFB laser using the solid-state dye laser medium of the present invention. Of these drawings, FIG. 2(A) shows a DFB laser which is oscillating. The numeral 10 denotes a solid-state dye laser medium, 20 a substrate, 30 excitation light, and 40 output light, and a diffraction grating provided on the upper surface of the solid-state dye laser medium 10 is not shown. FIG. 2(B) shows the laser immediately after lasing, and the numeral 16 denotes a portion where the dye has deteriorated upon irradiation with the excitation light 30. FIG. 2(C) shows the DFB laser in which the deteriorated portion 16 has recovered as a result of dye circulation after the laser immediately after lasing is allowed to stand for a while.

Normally, when the laser is allowed to stand overnight at room temperature, the deteriorated portion 16 can recover. Heating of the solid-state dye laser medium 10 in this case activates molecular motions of the polydimethylsiloxane, and thus promotes recovery as well. Since excessive heating may cause deterioration of the dye, however, the heating temperature is preferably 30 to 80° C. The heating time is preferably 1 to 12 hours.

4. Process for Production of Solid-State Dye Laser

The solid-state dye laser of the present invention can be produced by arranging by a publicly known method a publicly known resonance means and a publicly known excitation light source in the solid-state dye laser medium which has been obtained by the aforementioned first production process. A DFB laser, for example, can be produced by forming such an uppermost layer as to increase the refractive index by a value of the order of 0.01 to 0.1, in a thickness of 1 to 5 microns on the solid-state dye laser medium, and forming on the uppermost layer such a diffraction pattern as to impart a desired laser oscillation wavelength, by interference exposure using ultraviolet laser light or the like.

Alternatively, the solid-state dye laser of the present invention can be produced by arranging by a publicly known method a publicly known resonance means and a publicly known excitation light source in the solid-state dye laser medium which has been obtained by the aforementioned second or third production process.

As described earlier, moreover, when the solid-state dye laser medium of the present invention and a polydimethylsiloxane having a low dye concentration are contacted, the dye can be dispersed from the solid-state dye laser medium into the polydimethylsiloxane. That is, with the solid-state dye laser of the present invention, a different solid-state dye laser medium is provided, and can be used as a dye tank. FIGS. 7(A), 7(B) show the concept of such a dye tank-equipped solid-state dye laser. In FIGS. 7(A), 7(B), the numeral 100 denotes the excitation region of a solid-state dye laser medium, 102 a solid-state dye laser medium as a dye tank, and 104 a solid-state dye laser medium as a replacement cartridge, with a substrate, etc. being omitted.

As shown in FIG. 7(A), after a dye in the excitation region 100 of the solid-state dye laser medium is deteriorated by laser oscillation, a fresh dye can be conveyed from the dye tank 102 in contact with the excitation region 100 of the solid-state dye laser medium to the excitation region 100 of the solid-state dye laser medium. As shown in FIG. 7(B), moreover, if all the dye within the dye tank 102 is deteriorated, the replacement cartridge 104 is brought into contact with the excitation region 100 of the solid-state dye laser medium, whereby a fresh dye can be conveyed to the excitation region 100 of the solid-state dye laser medium. The volumes of the dye tank 102 and the replacement cartridge 104 are preferably larger than the volume of the excitation region 100 of the solid-state dye laser medium in order to increase the amount of molecules which can be replaced. Concretely, the volume of the dye tank or the replacement cartridge is preferably 10 to 100000 parts with respect to 1 part by volume of the excitation region of the solid-state dye laser medium.

EXAMPLES

Example 1

Production of Solid-State Dye Laser Using Toluene

Pyrromethene 597 (PM597, produced by Exciton) as a dye was dissolved in toluene to prepare a solution of a saturated concentration (100 to 130 mmol/L). This dye solution was mixed at a mixing ratio of 40:1 (volume ratio) with a dimethylsiloxane oligomer (SIM-360, produced by Shin-Etsu Chemical Co., Ltd.) being a polydimethylsiloxane precursor, and the mixture was stirred for 2 days for thorough uniform dispersing. Then, the dispersion was further heated at 72° C. to evaporate toluene, thus adjusting the system to a final dye concentration of 3 mmol/L.

After removal of toluene, 1 part by volume of a solidification agent (CAT-360, produced by Shin-Etsu Chemical Co., Ltd.) was mixed with 10 parts by volume of the above mixed solution.

A 2 cm×2 cm mold was placed on a glass substrate, and the above composition was cast into a hollow part of the mold to form a coating film. The coating film was heated at 72° C. for solidification, thereby forming a polydimethylsiloxane from the dimethylsiloxane oligomer. Time required for the solidification was 1 day. After solidification, the mold was dismounted to obtain a solid-state dye laser medium having a film thickness of 50 to 100 μm.

A half polymer or the like of polytrifluoroethyl methacrylate was spin coated on the solid-state dye laser medium, and then heated at 72° C. for polymerization and curing, thereby forming a polytrifluoroethyl methacrylate layer having a film thickness of 2 to 5 μm. Using interference exposure to second harmonic generation (SHG) at 244 nm of $Ar^+$ laser as an ultraviolet laser, a refractive index type DFB structure with a laser oscillation wavelength of 580 nm was formed in the polytrifluoroethyl methacrylate layer.

The so produced DFB laser was irradiated with second harmonic generation at 532 nm of Nd:YAG laser as excitation light under the following conditions: pulse energy of 28 μJ and repetition frequency of 100 Hz (first excitation cycle). For excitation, a constant location of the solid-state dye laser medium was irradiated with excitation light.

Figure 3:
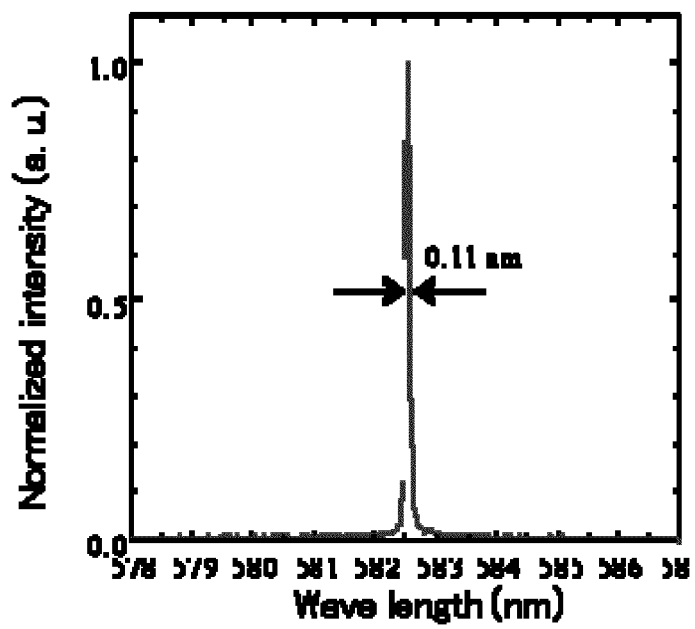
FIG. 3 is a view showing the spectrum of lasing oscillation by a solid-state dye laser of Example 1.

The spectrum during laser oscillation is shown in FIG. 3. Single mode oscillation at a wavelength of 582.5 nm was observed. The spectral width was 0.11 nm.

Figure 4:
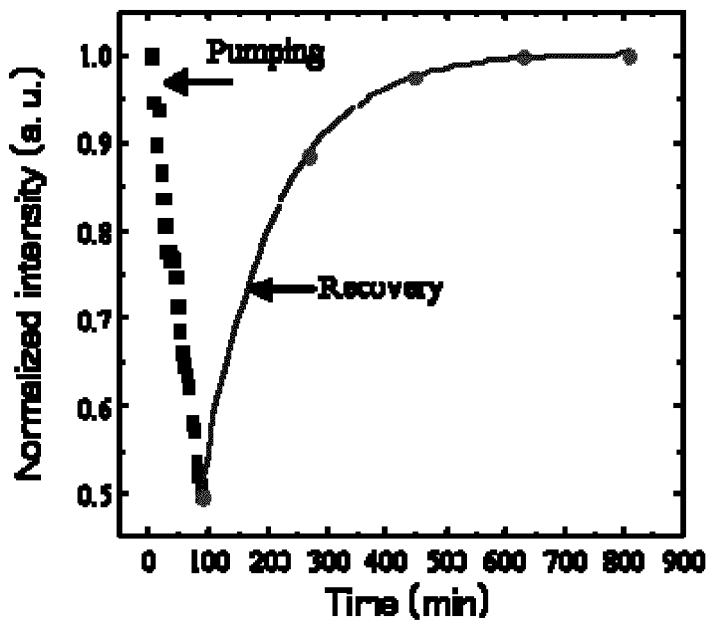
FIG. 4 is a view showing excitation (pumping) and recovery cycles in the solid-state dye laser of Example 1.

Since the output intensity fell to a half or less of the initial output intensity upon oscillation, the first excitation cycle was terminated. The portion irradiated with excitation light was decolorized. When the DFB laser was allowed to stand at room temperature, dye circulation recovered the DFB laser (first recovery cycle). After the DFB laser was allowed to stand for 250 minutes, it was irradiated again with excitation light, and output intensity was measured. The output intensity recovered to a value of the order of 88% of the initial output intensity. Similarly, the procedure of allowing the DFB laser to stand for a certain period of time, and then measuring the output intensity was repeated. The results are shown in FIG. 4. FIG. 4 demonstrates that the degree of recovery reached saturation when the DFB laser was allowed to stand for a time of the order of 9 hours at room temperature, and that the output intensity after recovery was nearly 100%.

Then, a second excitation cycle was carried out again under the same excitation conditions as in the first excitation cycle (pulse energy 28 μJ, repetition frequency 100 Hz). Durability was evaluated based on the number of shots after which the output intensity in the second excitation cycle fell to 50% of the initial intensity in the first excitation cycle, namely, a half-value intensity. The durability of the DFB laser obtained in the present Example was found to be $5.2 \times 10^5$ shots.

In the recovery curve of FIG. 4, a time constant defined as the time when a tangent to the rising portion reached the saturation point (1.0 a.u.) was 124 minutes.

In the present Example, the mold measuring 2 cm per side was disposed on the glass substrate, and the solid-state dye laser medium was formed. Actually, however, it is possible to form a solid-state dye laser medium with a side length of 0.1 mm to 100 cm, namely, a large area solid-state dye laser medium.

Example 2

A DFB laser was produced in the same manner as in Example 1, except that a silicone oil (KF-1065, produced by Shin-Etsu Chemical Co., Ltd.) was used instead of toluene, and that the step of removing toluene was not performed.

Figure 5:
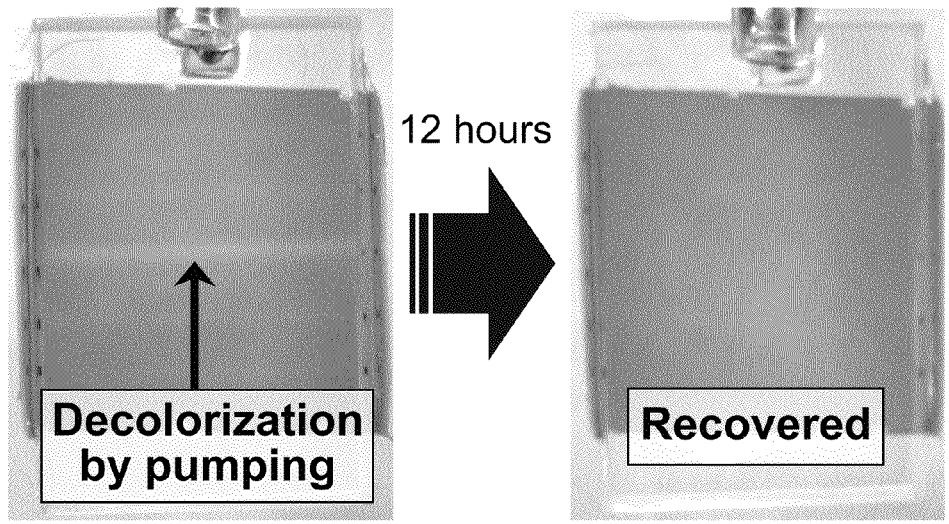
FIG. 5 is a view showing dye circulation in a solid-state dye laser of Example 2.
Figure 6:
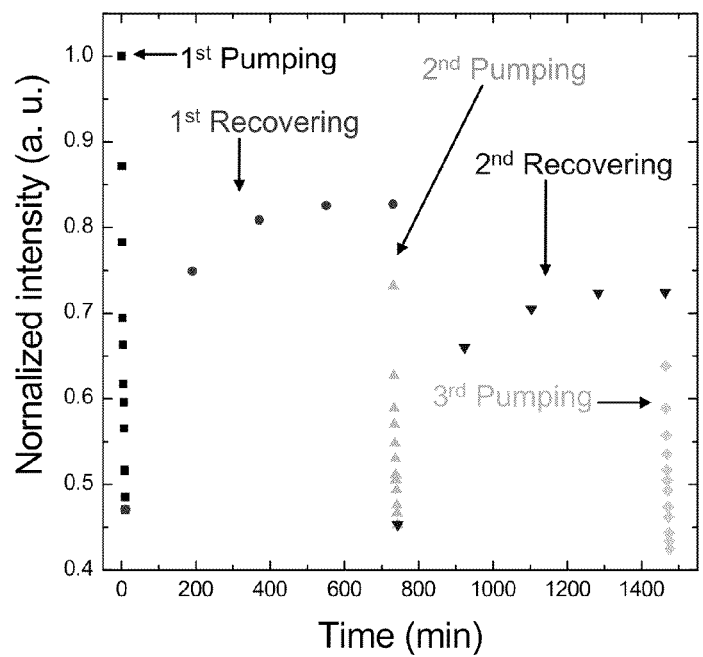
FIG. 6 is a view showing excitation (pumping) and recovery cycles in the solid-state dye laser of Example 2.

When laser oscillation was performed in the same manner as in Example 1, single mode oscillation at a wavelength of 583.9 nm was observed. The spectral width was 0.19 nm. In the present Example, the first recovery cycle was followed by a second excitation cycle, a second recovery cycle, and a third excitation cycle. The results are shown in FIGS. 5 and 6. FIG. 5 shows photographs of the DFB laser obtained in the present Example after the first excitation cycle and after the first recovery cycle (after the laser was allowed to stand for 12 hours). FIG. 5 reveals that a decolorized portion observed after the first excitation cycle disappeared after the first recovery cycle, clearly showing the occurrence of dye circulation.

FIG. 6 shows that in the first to third excitation (pumping) cycles, the output intensity decreased with increasing cycles. The durability determined in the same manner as in Example 1 was 55,000 shots.

The first recovery cycle recovered (increased) the output intensity, but the amount of recovery was 67% of minimum intensity in the first excitation cycle. Similarly, the amount of recovery in the second recovery cycle was 72% of minimum intensity in the second excitation cycle.

The degrees of recovery in the first and second recovery cycles became saturated in 9 hours, and the time constants were 120 minutes and 128 minutes, respectively.

A comparison between Example 1 and Example 2 shows that the laser of Example 1 was superior to the laser of Example 2 in durability and degree of recovery. The time required for the degree of recovery reaching saturation was comparable in both Examples.

The laser of Example 1 is considered to be superior to the laser of Example 2 in durability and degree of recovery, because the former laser contains no silicone oil.

Example 3

A solid-state dye laser medium was produced in the same manner as in Example 1, except that SIM-260 (produced by Shin-Etsu Chemical Co., Ltd.) was used as the dimethylsiloxane oligomer, CAT-260 (produced by Shin-Etsu Chemical Co., Ltd) was used as the solidification agent, and the solidification took a time of 3 days at 72° C. Evaluation of a laser using the laser medium confirmed that laser oscillation was obtained.

Reference Example 1

Using the dyes indicated below, maximum concentrations at which they were soluble in polydimethylsiloxane (PDMS) were investigated in the same manners as in Examples 1 and 2. The results are shown in Table 1.

Pyrromethene Dyes (Produced by Exciton):
PM650: Red
PM605: Orange
PM597: Orange
PM580: Brown
PM567: Yellow
PM556: Yellow
Rhodamine dyes (produced by Exciton):
Rh6G: Rose pink
Coumarin dyes (produced by Exciton):
C456: White

TABLE 1

| | Behavior of dissolution in PDMS when toluene was used | | | Behavior of dissolution in PDMS when silicone oil was used | | | |
| --- | --- | --- | --- | --- | --- | --- | --- |
| | Solubility | State | Soluble concentration | Solubility | State | Soluble concentration | Mw |
| PM650 | X | — | — | Δ | dissolved | less than 2.5 mM | 301.15 |
| PM605 | X | — | — | ○ | dissolved | less than 6.0 mM | 376.25 |
| PM597 | ○ | dissolved | 3.0 mM + α | ◉ | dissolved | 6.0 mM + α | 374.32 |
| PM580 | X | — | — | X | lumpy→ dispersed | — | 374.32 |
| PM567 | X | — | — | Δ | dissolved | less than 2.4 mM | 318.22 |

TABLE 1-continued

| | Behavior of dissolution in PDMS when toluene was used | | | Behavior of dissolution in PDMS when silicone oil was used | | | |
|---|---|---|---|---|---|---|---|
| | Solubility | State | Soluble concentration | Solubility | State | Soluble concentration | Mw |
| PM556 | X | — | — | X | dispersed | — | 466.19 |
| Rh6G | X | — | — | X | lumpy→ dispersed | — | — |
| C456 | X | — | — | X | lumpy→ dispersed | — | — |

As shown in Table 1, when the dye was dissolved in polydimethylsiloxane with the use of toluene as in Example 1, only PM 597 exhibited solubility of up to 3 mmol/L. However, none of the other pyrromethene dyes could be dissolved to reach dye dissolution concentrations of up to 2 mmol/L at which laser oscillation was possible.

When the dye was dissolved in polydimethylsiloxane with the use of a silicone oil as in Example 2, any of the dyes PM650, PM605, PM567 and PM597 was found to be soluble to concentrations at which laser oscillation was possible.

The above findings demonstrate that the use of a silicone oil can increase the solubility of the dye in polydimethylsiloxane.

Example 4

Solid-state dye laser media were produced in the same manner as in Example 2 using PM650, PM605 and PM567 as dyes, and lasers using the resulting solid-state dye laser media were evaluated. These lasers were confirmed to obtain laser oscillation.

Example 5

1 Part by volume of a solidification agent (CAT-360, produced by Shin-Etsu Chemical Co., Ltd.) was mixed with 10 parts by volume of a dimethylsiloxane oligomer (SIM-360, produced by Shin-Etsu Chemical Co., Ltd.) being a precursor for polydimethylsiloxane. A 2 cm×2 cm mold was placed on a glass substrate, and the resulting dimethylsiloxane oligomer composition was cast into a hollow part of the mold to form a coating film. The coating film was heated at 72° C. for solidification, thereby forming a polydimethylsiloxane from the dimethylsiloxane oligomer. Time required for the solidification was 1 day. After solidification, the mold was dismounted to obtain a polydimethylsiloxane molded article having a film thickness of 100 μm.

Pyrromethene 597 (PM597, produced by Exciton) as a dye was dissolved in toluene to prepare a solution of a saturated concentration (100 to 130 mmol/L). This dye solution was mixed at a mixing ratio of 40:1 (volume ratio) with a dimethylsiloxane oligomer (SIM-360, produced by Shin-Etsu Chemical Co., Ltd.) being a polydimethylsiloxane precursor, and the mixture was stirred for 2 days for thorough uniform dispersing. Then, the dispersion was further heated at 72° C. to evaporate toluene, thus adjusting the system to a final dye concentration of 3 mmol/L to obtain a dye-containing medium.

Figure 8:
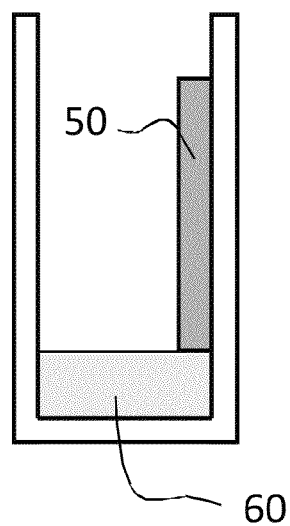
FIG. 8 is a view showing an embodiment in which a solution and a polydimethylsiloxane molded article are brought into contact.

FIG. 8 shows an embodiment in which this medium and the polydimethylsiloxane molded article are brought into contact. In FIG. 8, the numeral 50 denotes the polydimethylsiloxane molded article, and the numeral 60 denotes the dye-containing medium. As shown in FIG. 8, the dye-containing medium 60 was charged into a container, and the temperature of the medium was kept at 25° C. The medium 60 was contacted with an end of the polydimethylsiloxane molded article 50 for 24 hours to disperse the dye in the polydimethylsiloxane, thereby producing a solid-state dye laser medium. Using this medium, a laser was produced in the same manner as in Example 1, and evaluated. Obtainment of laser oscillation was confirmed.

Example 6

A solid-state dye laser medium was produced in the same manner as in Example 5, except that the temperature of the medium during contact was set at 75° C. A laser using the solid-state dye laser medium was evaluated. It was confirmed that laser oscillation was obtained.

Figure 9:
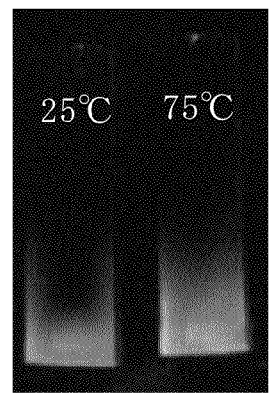
FIG. 9 is a view showing images obtained by observing solid-state dye laser media of Examples 5 and 6 under illumination with ultraviolet light.

FIG. 9 shows images obtained by observing the solid-state dye laser media obtained in Examples 5 and 6 under illumination with ultraviolet rays. FIG. 9 reveals that the higher the temperature of the solution, the more promptly the dye dispersed.

EXPLANATIONS OF LETTERS OR NUMERALS

10 Solid-state dye laser medium
100 Excitation region of solid-state dye laser medium
102 Dye tank
104 Replacement cartridge
12 Solid medium of polydimethylsiloxane
120 Cavities in nanoporous structure within polydimethylsiloxane
14 Dye
16 Portion with dye deteriorated
20 Substrate
30 Excitation light
40 Output light
50 Polydimethylsiloxane molded article
60 Dye-containing medium

The invention claimed is:

1. A solid-state dye laser medium, comprising:
a polydimethylsiloxane having a nanoporous structure; and
a dye dissolved in the polydimethylsiloxane and having such solubility as to impart a dye concentration of 2 mmol/L or more in the medium, the dye moving within the medium,
wherein the dye deteriorated by irradiation with light moves, and the dye which has not been deteriorated moves to a portion irradiated with light, whereby the medium can recover functions.

2. The medium according to claim 1, wherein the dye is a pyrromethene dye.

3. The medium according to claim 1, further comprising a silicone oil.

4. A process for producing the solid-state dye laser medium according to claim 1, comprising the steps of:
dissolving the dye in a nonpolar solvent having a dielectric constant of 5 or less to obtain a solution;
mixing the solution with a liquid dimethylsiloxane oligomer to obtain a composition;
removing the nonpolar solvent in the composition;
coating the composition rid of the solvent on a substrate to form a coating film; and
polymerizing or crosslinking the oligomer in the coating film rid of the solvent to form a polydimethylsiloxane.

5. A process for producing the solid-state dye laser medium according to claim 1, comprising the steps of:
dissolving the dye in a silicone oil to obtain a solution;
mixing the solution with a liquid dimethylsiloxane oligomer to obtain a composition;
coating the composition on a substrate to form a coating film; and
polymerizing or crosslinking the oligomer in the coating film to form a polydimethylsiloxane.

6. A process for producing the solid-state dye laser medium according to claim 1, comprising the steps of:
providing a first polydimethylsiloxane;
dissolving the dye in a medium selected from the group consisting of a dimethylsiloxane oligomer and a second polydimethylsiloxane, to obtain a dye-containing medium; and
bringing the medium and the first polydimethylsiloxane into contact to disperse the dye in the first polydimethylsiloxane.

7. A dye laser, comprising:
the solid-state dye laser medium according to claim 1;
an excitation light source; and
resonance means,
wherein the dye deteriorated by irradiation with light moves, and the dye which has not been deteriorated moves to a portion irradiated with light, whereby the dye laser can recover functions.

8. A process for producing the dye laser according to claim 7, comprising the steps of:
dissolving the dye in a nonpolar solvent having a dielectric constant of 5 or less to obtain a solution;
mixing the solution with a liquid dimethylsiloxane oligomer to obtain a composition;
removing the nonpolar solvent in the composition;
coating the composition rid of the solvent on a substrate to form a coating film;
polymerizing or crosslinking the oligomer in the coating film rid of the solvent to form a polydimethylsiloxane, thereby forming a solid-state dye laser medium; and
arranging resonance means and an excitation light source in the medium.

9. A process for producing the dye laser according to claim 7, comprising the steps of:
dissolving the dye in a silicone oil to obtain a solution;
mixing the solution with a liquid dimethylsiloxane oligomer to obtain a composition;
coating the composition on a substrate to form a coating film;
polymerizing or crosslinking the oligomer in the coating film to form a polydimethylsiloxane, thereby forming a solid-state dye laser medium; and
arranging resonance means and an excitation light source in the medium.

10. A process for producing the dye laser according to claim 7, comprising the steps of:
providing a first polydimethylsiloxane;
dissolving the dye in a medium selected from the group consisting of a dimethylsiloxane oligomer and a second polydimethylsiloxane, to obtain a dye-containing medium;
bringing the medium and the first polydimethylsiloxane into contact to disperse the dye in the first polydimethylsiloxane, thereby forming a solid-state dye laser medium; and
arranging resonance means and an excitation light source in the laser medium.

* * * * *